(12) United States Patent
Talukdar et al.

(10) Patent No.: US 10,034,326 B2
(45) Date of Patent: Jul. 24, 2018

(54) UPLINK DATA TRANSFER

(71) Applicant: Nokia Technologies Oy, Espoo (FI)

(72) Inventors: Anup Talukdar, Glendale Heights, IL (US); Mark Cudak, Rolling Meadows, IL (US)

(73) Assignee: Nokia Technologies Oy, Espoo (FI)

(*) Notice: Subject to any disclaimer, the term of this patent is extended or adjusted under 35 U.S.C. 154(b) by 140 days.

(21) Appl. No.: 14/719,695

(22) Filed: May 22, 2015

(65) Prior Publication Data

US 2016/0345209 A1    Nov. 24, 2016

(51) Int. Cl.
| | |
|---|---|
| *H04W 76/20* | (2018.01) |
| *H04W 76/15* | (2018.01) |
| *H04W 88/02* | (2009.01) |
| *H04W 88/08* | (2009.01) |
| *H04W 36/00* | (2009.01) |
| *H04W 76/27* | (2018.01) |

(52) U.S. Cl.
CPC ......... *H04W 76/20* (2018.02); *H04W 76/15* (2018.02); *H04W 36/0055* (2013.01); *H04W 76/27* (2018.02); *H04W 88/02* (2013.01); *H04W 88/08* (2013.01)

(58) Field of Classification Search
CPC ......... H04W 74/0833; H04W 72/005; H04W 74/08; H04W 36/06; H04W 4/005; H04W 52/04; H04W 52/221; H04W 52/245; H04W 56/005; H04W 72/0413; H04W 72/0473; H04W 74/004; H04W 84/047; H04W 74/006; H04W 48/06; H04W 4/10; H04W 52/0216

USPC .......................................................... 330/331
See application file for complete search history.

(56) References Cited

U.S. PATENT DOCUMENTS

| | | | |
|---|---|---|---|
| 9,467,945 B2* | 10/2016 | Diachina ........... | H04W 52/0229 |
| 2011/0206000 A1* | 8/2011 | Kwon ................. | H04W 74/002 370/330 |
| 2012/0281566 A1 | 11/2012 | Pelletier et al. .............. | 370/252 |
| 2013/0260772 A1 | 10/2013 | Kim et al. ..................... | 455/447 |
| 2014/0050148 A1 | 2/2014 | Choi ............................. | 370/328 |

FOREIGN PATENT DOCUMENTS

| | | |
|---|---|---|
| EP | 2197236 A | 6/2010 |
| WO | WO-2014/009250 A1 | 1/2014 |

OTHER PUBLICATIONS

Cudak, Mark, et al., "Moving Towards MMWave-Based Beyond-4G (B-4G) Technology", IEEE VTC, Spring 2013, Jun. 2-5, 2013, 5 pgs.
Talukdar, Anup, et al., "Handoff Rates for Millimeterwave 5G Systems", IEEE VTC, Spring 2014, May 18-21, 2014, 5 pgs.

(Continued)

*Primary Examiner* — Natasha W Cosme
(74) *Attorney, Agent, or Firm* — Harrington & Smith

(57) ABSTRACT

A method including transmitting an uplink access request message by a user device (UD) for an access point (AP) in an access point cluster set of the UD; and monitoring a downlink control channel by the user device (UD) to determine, based at least partially upon the transmitted uplink access request message, if a subsequent uplink communication is to be transmitted by the user device (UD) to a serving access point and/or a stand-by access point of the access point cluster set.

24 Claims, 10 Drawing Sheets

(56) References Cited

OTHER PUBLICATIONS

Cudak, Mark, et al., "Millimeter Wave Access Architecture With Cluster of Access Points", U.S. Appl. No. 14/413,776, filed Jan. 9, 2015, 61 pgs.
"Cluster Set Management in Communication System", U.S. Appl. No. 14/597,970, filed Jan. 15, 2015, 22 pgs.
"Method and Apparatus for Implementing Efficient Low-Latency Uplink Access", U.S. Appl. No. 14/597,994, filed Jan. 15, 2015, 40 pgs.
"Method and Apparatus for Implementing Low-Latency and Robust Uplink Access", U.S. Appl. No. 14/598,003, filed Jan. 15, 2015, 47 pgs.
"Rapid Rerouting in a Communication System", U.S. Appl. No. 14/597,987, filed Jan. 15, 2015, 43 pgs.
"Millimeterwave Access Architecture With Rapid Rerouting", U.S. Appl. No. 61/669,373, filed Jul. 9, 2012, 66 pgs.

* cited by examiner

# UPLINK DATA TRANSFER

BACKGROUND

Technical Field

The exemplary and non-limiting embodiments relate generally to wireless communications and, more particularly, to uplink data transfer.

Brief Description of Prior Developments

In a conventional wireless system, the user device (UD) performs an uplink access via its serving access point (AP) and, after a successful uplink access, uplink data transfer is done via the serving AP.

SUMMARY

The following summary is merely intended to be exemplary. The summary is not intended to limit the scope of the claims.

In accordance with one aspect, an example method comprises transmitting an uplink access request message by a user device (UD) for an access point (AP) in an access point cluster set of the UD; and monitoring a downlink control channel by the user device (UD) to determine, based at least partially upon the transmitted uplink access request message, if a subsequent uplink communication is to be transmitted by the user device (UD) to a serving access point and/or a stand-by access point of the access point cluster set.

In accordance with another aspect, an example embodiment is provided in an apparatus comprising at least one processor; and at least one non-transitory memory including computer program code, the at least one memory and the computer program code configured to, with the at least one processor, cause the apparatus to: transmit an uplink access request message by the apparatus for an access point (AP) in an access point cluster set of the apparatus; and monitor a downlink control channel by the apparatus to determine, based at least partially upon the transmitted uplink access request message, if a subsequent uplink communication is to be transmitted by the apparatus to a serving access point and/or a stand-by access point of the access point cluster set.

In accordance with another aspect, an example method comprises determining by an access point (AP), upon receiving an uplink access request message from a user device (UD), if the access point is a serving access point or a stand-by access point for the user device (UD); and when the access point determines that it is a stand-by access point for the user device (UD), selecting a data transfer mode by the access point for a subsequent uplink communication to be transmitted by the user device (UD) and transmitting a message from the access point to the user device (UD).

In accordance with another aspect, an example an embodiment is provided in an apparatus comprising at least one processor; and at least one non-transitory memory including computer program code, the at least one memory and the computer program code configured to, with the at least one processor, cause the apparatus to: determine by the apparatus, upon receiving an uplink access request message from a user device (UD), if the apparatus is a serving access point or a stand-by access point for the user device (UD); and when the apparatus determines that it is a stand-by access point for the user device (UD), selecting a data transfer mode for a subsequent uplink communication to be transmitted by the user device (UD) and transmitting a message from the apparatus to the user device (UD).

In accordance with another aspect, an example method comprises receiving an uplink data transfer handover request by the Cluster Set Manager (CSM) of an user device (UD), and the CSM determining the serving access point of the UD, and subsequently forwarding the uplink data transfer handover request to the serving AP of the UD.

BRIEF DESCRIPTION OF THE DRAWINGS

The foregoing aspects and other features are explained in the following description, taken in connection with the accompanying drawings, wherein.

DETAILED DESCRIPTION OF EMBODIMENTS

Figure 1:
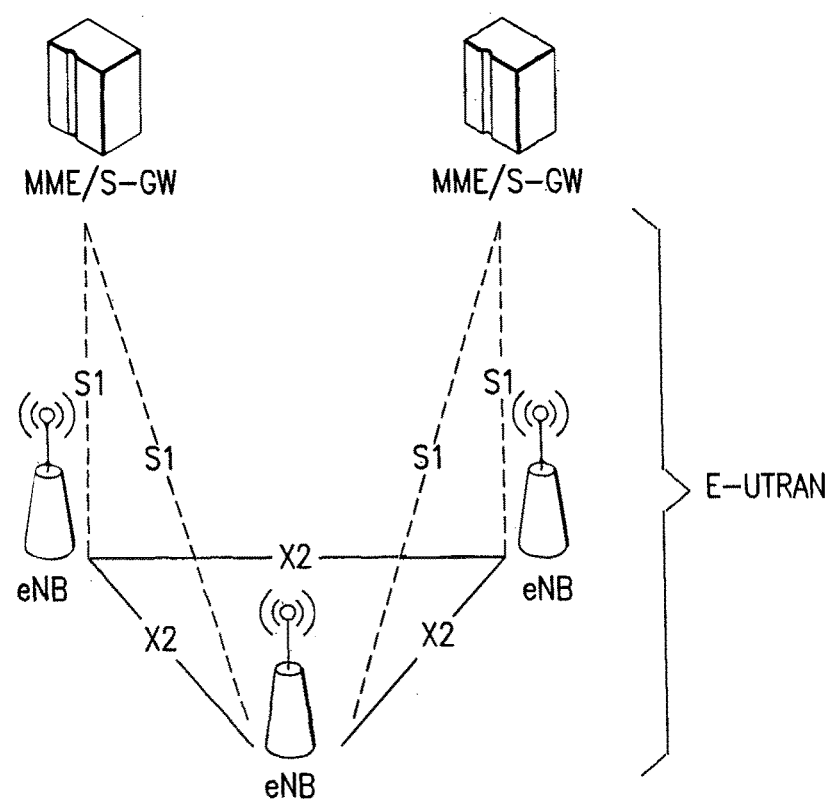
FIG. 1 is a diagram illustrating an example of an overall architecture of a E-UTRAN (evolved UMTS Terrestrial Radio Access) system (an air interface of 3GPP's Long Term Evolution (LTE) upgrade path for mobile networks)

The following abbreviations that may be found in the specification and/or the drawing figures are defined as follows:

| | |
|---|---|
| 3GPP | Third Generation Partnership Program |
| AP | Access Point |
| ACK | Acknowledgement |
| ARQ | Automatic Repeat Request |
| CSM | Cluster Set Manager |
| DL | Downlink |
| eNB | enhanced Node B (base station according to LTE terminology) |
| E-UTRAN | E- Universal Terrestrial Radio Access Network |
| LOS | Line Of Sight |
| LTE | Long-Term Evolution |
| mmWave | Millimeter wave |
| NACK | Negative acknowledgement |
| RACH | Random Access CHannel |
| TDD | Time division duplex |
| UD | User Device |
| UL | Uplink |

FIG. 1 shows an example of overall architecture of an E-UTRAN system. The E-UTRAN system includes eNBs, providing an E-UTRAN user plane (PDCP/RLC/MAC/PHY) and control plane (RRC) protocol terminations towards the UD (not shown in FIG. 1). The eNBs are interconnected with each other by means of an X2 interface. The eNBs are also connected by means of a S1 interface to an EPC (Enhanced Packet Core), more specifically to a MME (Mobility Management Entity) by means of a S1 MME interface and to a Serving Gateway (S-GW) by means of a S1 interface. The S1 interface supports a many-to-many relationship between MMEs/S-GW and eNBs. One or more of the eNB may form an access point (AP) for a MillimeterWave (=Wave) frequency bands, or the mmWave APs may be otherwise connected to the network shown in FIG. 1. Alternatively, the mmWave APs may form their own network, separate from the network shown in FIG. 1; perhaps connected to the network shown in FIG. 1 by a MME/S-GW for example.

Figure 2:
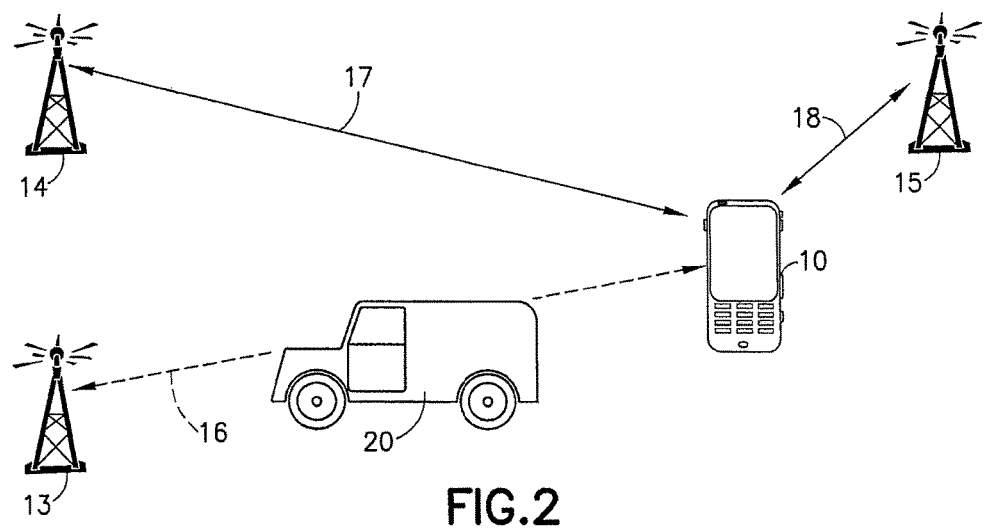
FIG. 2 is a diagram illustrating a user device in a network of access points, where communication between the user device and one of the access points is blocked by an object.

Referring also to FIG. 2, a user device (UD) 10 is shown. In this example the UD 10 is a smartphone. However, in alternate examples the UD may be, for example, a tablet computer, a PDA, a smart watch, or any other suitable device configured to wireless communications including in a vehicle such as a car for example. The UD 10 is configured to be able to communicate with the APs 13, 14, 15 by MillimeterWave (mmWave) frequency bands as illustrated by possible links 16, 17, 18 shown in FIG. 2.

Figure 3:
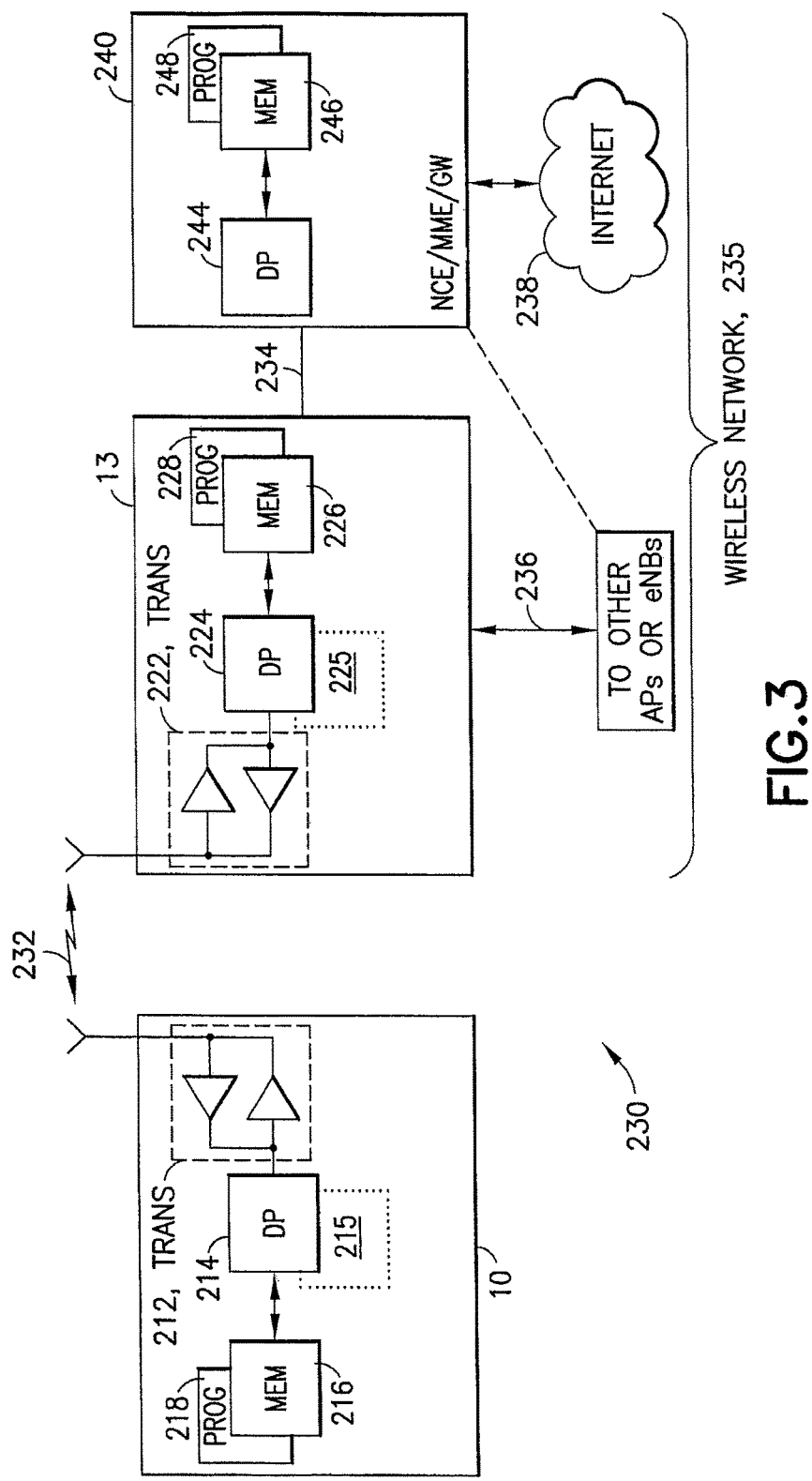
FIG. 3 is a diagram illustrating some components of the wireless system shown in FIGS. 1 and 2.

Referring also to FIG. 3, in the wireless system 230 a wireless network 235 is adapted for communication over a wireless link 232 with an apparatus, such as a mobile communication device which may be referred to as a UD 10, via a network access node or access point (AP) 13. The network 235 may include a network control element (NCE) 240 that may include MME/S-GW functionality, and which provides connectivity with a network, such as a telephone network and/or a data communications network (e.g., the internet 238). In the example 5G=Wave system shown, the APs will be inter-connected among themselves. A few the APs, designated as egress APs, will be connected to the NCE/MME/GW 240.

The UD 10 includes a controller, such as a computer or a data processor (DP) 214, a computer-readable memory medium embodied as a memory (MEM) 216 that stores a program of computer instructions (FROG) 218, and a suitable wireless interface, such as radio frequency (RF) transceiver 212, for bidirectional wireless communications with the AP 13 via one or more antennas.

The AP 13 also includes a controller, such as a computer or a data processor (DP) 224, a computer-readable memory medium embodied as a memory (MEM) 226 that stores a program of computer instructions (FROG) 228, and a suitable wireless interface, such as RF transceiver 222, for communication with the UD 10 via one or more antennas. The AP 13 is coupled via a data/control path 234 to the NCE 240. The path 234 may be implemented as an interface. The AP 13 may also be coupled to other APs and perhaps eNB(s) via data/control path 236, which may be implemented as an interface.

The NCE 240 includes a controller, such as a computer or a data processor (DP) 244, a computer-readable memory medium embodied as a memory (MEM) 246 that stores a program of computer instructions (FROG) 248.

At least one of the PROGs 218, 228 and 248 is assumed to include program instructions that, when executed by the associated DP, enable the device to operate in accordance with exemplary embodiments of this invention, as will be discussed below in greater detail. That is, various exemplary embodiments of this invention may be implemented at least in part by computer software executable by the DP 214 of the UD 10; by the DP 224 of the AP 13; and/or by the DP 244 of the NCE 240, or by hardware, or by a combination of software and hardware (and firmware).

For the purposes of describing various exemplary embodiments in accordance with this invention the UD 10 and the AP 13 may also include dedicated processors, for example RRC module 215 and a corresponding RRC module 225. RRC module 215 and RRC module 225 may be constructed so as to operate in accordance with various exemplary embodiments in accordance with this invention.

The computer readable MEMs 216, 226 and 246 may be of any type suitable to the local technical environment and may be implemented using any suitable data storage technology, such as semiconductor based memory devices, flash memory, magnetic memory devices and systems, optical memory devices and systems, fixed memory and removable memory. The DPs 214, 224 and 244 may be of any type suitable to the local technical environment, and may include one or more of general purpose computers, special purpose computers, microprocessors, digital signal processors (DSPs) and processors based on a multicore processor architecture, as non-limiting examples. The wireless interfaces (e.g., RF transceivers 212 and 222) may be of any type suitable to the local technical environment and may be implemented using any suitable communication technology such as individual transmitters, receivers, transceivers or a combination of such components.

5th Generation (5G) wireless networks are being designed to deliver peak data rates of the order of about 10 Gbps, and the target latency requirements have been set to the order of about 1 msec in order to serve applications with ultra-low latency performance requirements. Millimeterwave (mmWave) frequency bands have been identified as a promising candidate for 5G cellular technology. Spectrum in traditional cellular bands (below 6 GHz) is finite and, as cellular data traffic demand continues to grow, new frequency bands must be considered. Unlike traditional cellular bands, large blocks of contiguous spectrum may be allocated at mmWave bands allowing for bandwidths on the order of 10 GHz or more. Moreover, the mmWave bands allow for multi-element antenna arrays composed of very small elements, such as on the order of IC chip scales for example, providing large antenna gain and sufficient power output through over-the-air power combining. This combination of large bandwidths and novel device architectures allows mmWave cellular to provide peak rates on the order of 10 Gbps and ample capacity to meet future demands.

However the propagation characteristics in the mmWave band are more challenging than traditional cellular. Diffraction at mmWave bands is effectively non-existent and propagation behaves similar to visible light. Transmission through most objects is diminished where foliage and other common obstacles can produce severe shadowing. Reflective power, on the other hand, is improved offering new opportunities for completing the link, but may be 15 dB-40 dB weaker. In a typical urban deployment, mmWave access points (AP) are expected to be installed on top of street-side poles, possibly at street corners; other deployment scenarios are stadiums, college campus courtyards, tourist hotspots.

The severe shadowing loss characteristics in the mmWave band implies that, the radio link between a user device (UD) and its serving AP will be disrupted if the line-of-sight (LOS) is blocked by obstacles. For a pedestrian walking along the sidewalk in a city block, its LOS may be blocked by fixed obstacles, such as trees, or moving obstacle such as large trucks, or other pedestrians. An example of this is shown in FIG. 2, where the link 16 between the UD 10 and the AP 13 is blocked by the truck 20. In a campus courtyard or a tourist hotspot LOS blocking may be caused by crowds. Other types of LOS blocking may be caused by user motions such as hand or body rotations. In order to deliver reliable connectivity to a user in presence of obstacles, a mmWave access point network should be built with enough redundancies of APs such that, in the event of a LOS blocking, the network connection of the UD can be rapidly rerouted via another AP. For example, in FIG. 2 the APs 14 and 15 are other APs which can be used by the UD 10 when the line-of-sight (LOS) between the UD 10 and the AP 13 is blocked by the truck 20. The LOS between the UD 10 and the APs 14, 15 is not blocked and, thus, the possible links 17, 18 are potentially available.

Each UD in a mmWave network is served by a cluster of APs, called its cluster set. Members of the cluster set of an UD are selected based on the accessibility of the APs from the UD. An AP is accessible to an UD if the UD can receive the beacon waveform from the AP, (which can be a broadcast beacon or a swept beam beacon for example), above a certain SNR threshold, and/or the AP can receive the beacon waveform from the UD above a certain SNR threshold. The accessibility information between an AP and a UD consists of the best transmit and receive antenna beam weights and the corresponding signal strengths. In FIG. 2, APs 13, 14, 15 form the cluster set for the UD 10. Among the APs in the cluster set, one particular AP can be selected as the "serving AP" for the UD; through which the network communicates with the UD. In FIG. 2, AP 13 is the serving AP. The other APs 14, 15 in the cluster set are "stand-by APs". The UD 10 attempts to maintain continuous connectivity with each member AP 13, 14, 15 of its cluster set by maintaining synchronization with the symbol and frame structure, downlink and uplink control channels, and also maintain beam synchronization by selecting best beams for DL and UL communication.

An example of an air-interface frame structure for a mmWave 5G system is shown in 5. In this example structure a 20 msec superframe is subdivided into 40 subframes; each of duration 500 microsec. Each subframe is further divided into five (5) slots of 100 microsec duration. A slot can be a synchronization slot, an uplink random access channel (RACH) or a data slot.

A synchronization slot may be used for system acquisition, and also for UD specific beam synchronization. In one example, the sync channel is transmitted every 20 msec. The RACH slot can be used by an UD to send uplink resource request, and additionally it can also be used by the UDs to provide feedback on beam selection. A data slot may contain three segments: downlink control, uplink control and data. The downlink control region is used to communicate the downlink/uplink resource allocations. The uplink control region can be used for sending ARQ ACK/NACK for downlink data transmissions, channel state information feedback, uplink polling to request uplink resource. The data segment can be used for either downlink data transmission or uplink data transmission as part of the dynamic TDD feature, and is determined by the resource allocation in the downlink control channel. For high efficiency, communications over the downlink control region, uplink control region and the data segment uses user-specific beamforming.

Figure 4:
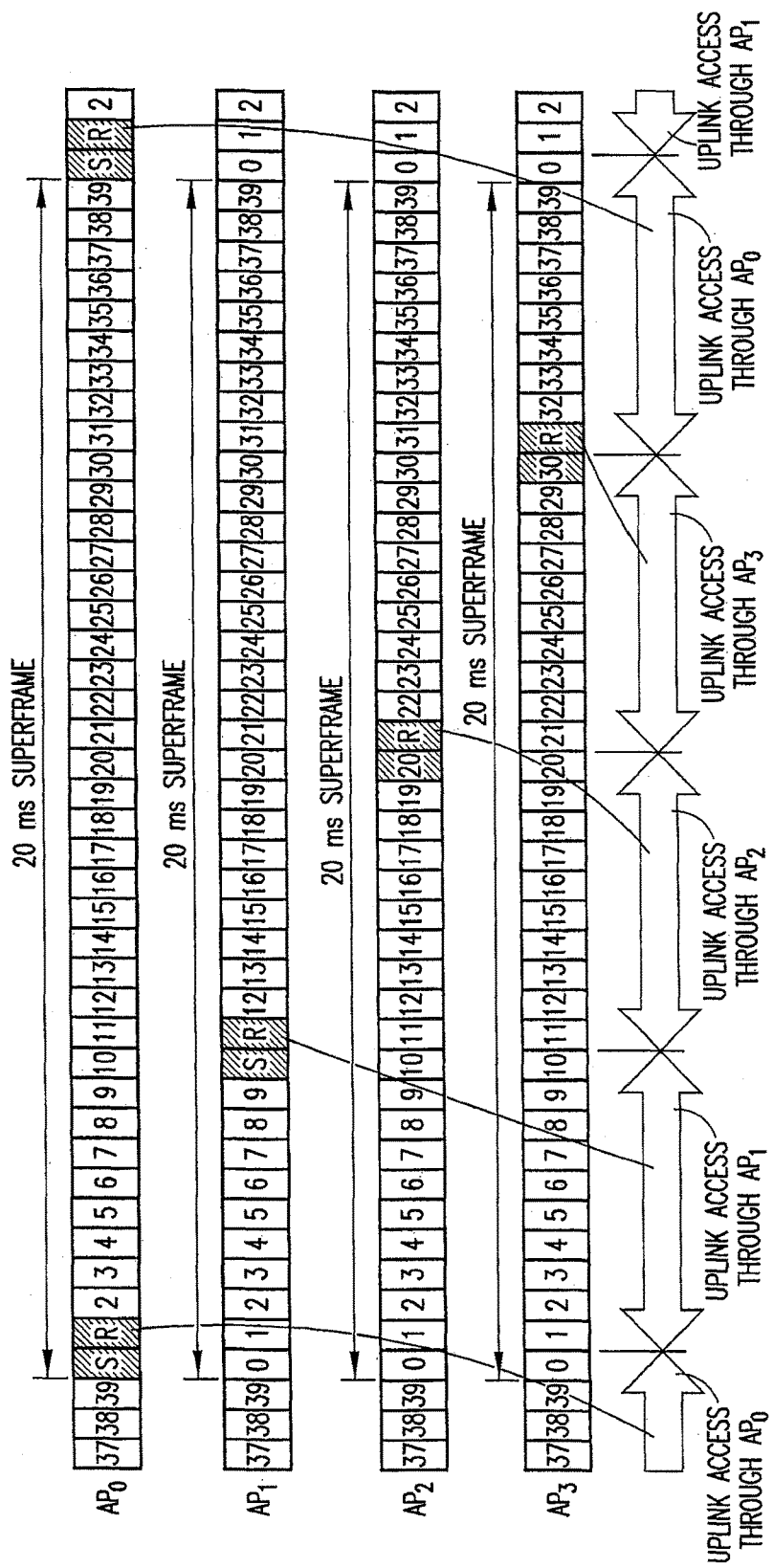
FIG. 4 is a diagram illustrating uplink access in an example mmWave system.
Figure 5:
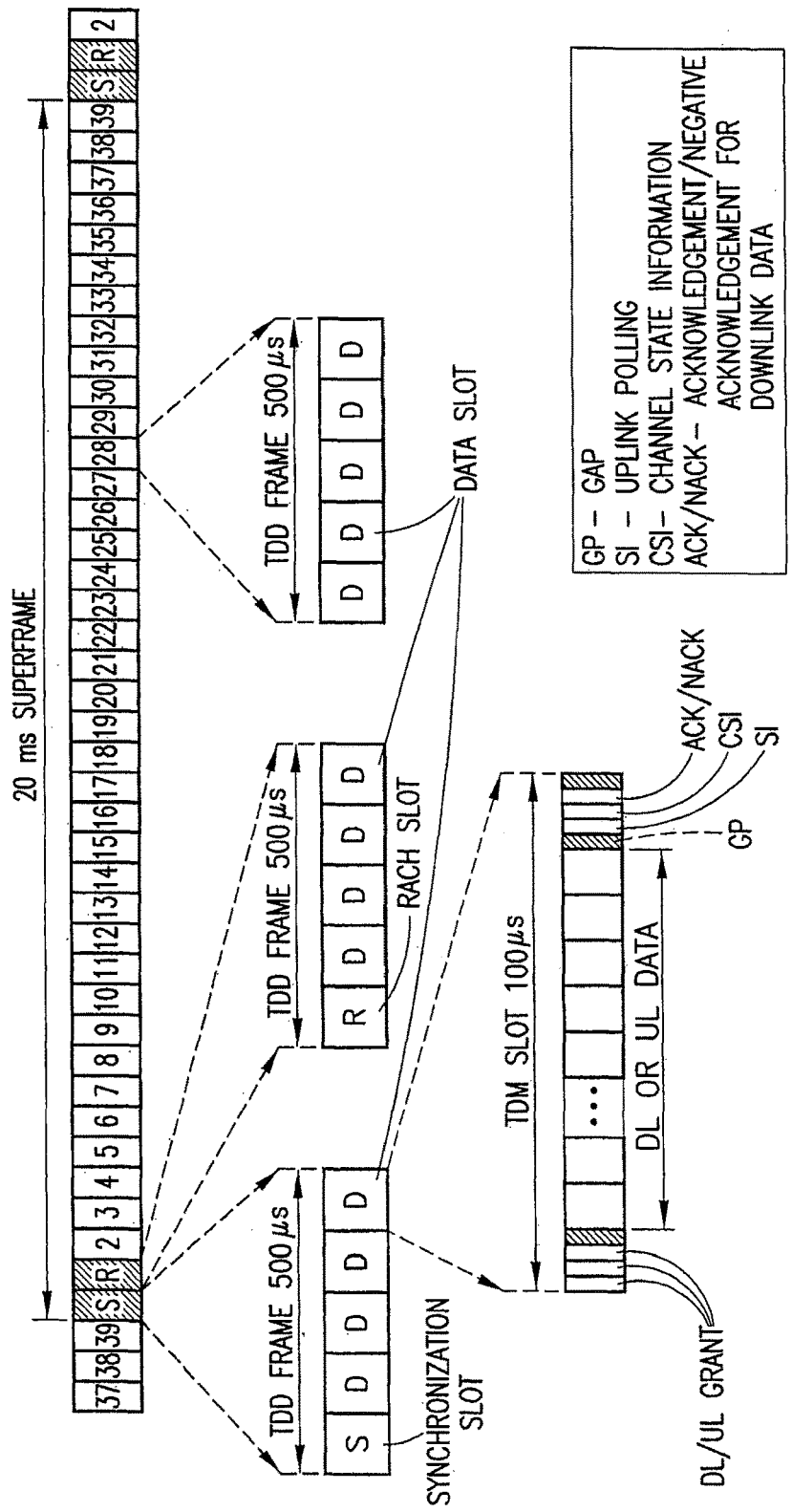
FIG. 5 is a diagram illustrating an example of a mmWave frame structure.

Uplink access mechanisms may be used which reduce the uplink access latency and also improve the robustness of uplink access procedure in the events of frequent radio link blockages. In these schemes, the uplink access opportunities, which can be RACH slots or uplink polling channels, may be allocated in a staggered-manner among the APs in the cluster set of the UD. When a UD needs to perform an uplink access (for example on arrival of data in the uplink data buffer queue after a period of inactivity), instead of waiting for the next uplink access opportunity of its serving AP, the UD may use the next earliest UL access opportunity of an AP in its cluster set. This is illustrated in FIG. 4. In this diagram, the UD 10 is assumed to have a cluster set with four APs (AP0, AP1, AP2 and AP3). The uplink access opportunity is assumed to be a RACH slot, but it can also be an uplink polling channel. In FIG. 4, "R" includes the RACH slot and "S" includes the synchronization slot.

Depending on the arrival time of the data in the uplink queue, the UD may perform an uplink access over the uplink access opportunity of the access points as shown in Table 1 for example for a cluster set having four APs.

TABLE 1

| Uplink data arrival at queue and RACH usage | |
|---|---|
| Data arrival in uplink queue | Access Point and RACH slot to be used by the UD |
| During sub frame 1-10 | $AP_1$ in sub frame 11 |
| During subframe 11-20 | $AP_2$ in subframe 21 |
| During subframe 21-30 | $AP_3$ in subframe 31 |
| During subframe 31-40 | $AP_0$ in subframe 1 |

A successful uplink access, whether performed over Random Access CHannel (RACH) or uplink polling channel, results in the access point receiving an uplink resource request from the UD, and the UD receiving an acknowledgement from the AP. An access point to which the uplink access was sent successfully is designated as the "uplink-access AP".

Figure 6:
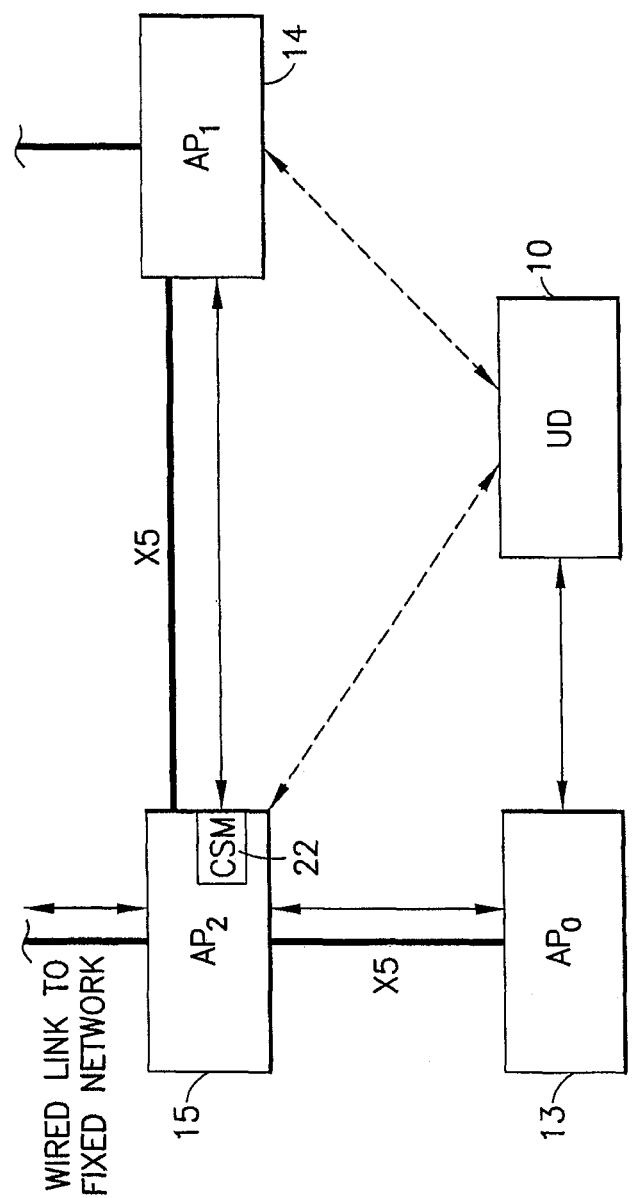
FIG. 6 is a diagram illustrating an example of a cluster set of a user device and its cluster set manager.

Referring also to FIG. 6, an example is shown corresponding to the UD and cluster set shown in FIG. 2. The cluster set of the UD is configured and managed by the Cluster Set Manager (CSM) 22. There is a logical instance of CSM 22 for each UD which is located in the network. The location of the CSM 22 may be close to the APs in the cluster set to enable low-latency communication with those APs and the UD. In FIG. 6 the cluster set contains three APs, $AP_0$ is the serving AP of the UD whereas $AP_1$ and $AP_2$ are stand-by APs. In this diagram, the stand-by AP 15 has the cluster set manager (CSM) 22 for the user device (UD) 10. The CSM 22 of the UD knows the identity of the current serving AP 13 of the UD.

If having a clear line-of-sight (LOS) between the UD 10 and the serving AP 13, the UD 10 may perform the uplink access via its serving AP 13 and, after a successful uplink access, uplink data transfer may be done via the serving AP 13. However, in the uplink access scheme described above in a mmWave 5G network, it is possible that, the UD performs a successful uplink access via an AP which is not its serving AP, such as with APs 14 or 15 rather than AP 13 in this example. With features as described herein, the problem of how uplink data transfer can be accomplished in this scenario may be addressed.

Generally, since the serving AP 13 provides the best link quality, it is the preferred AP for both DL and UL communication for the UD 10; so that data throughput can be maximized. If the uplink-access AP is not the serving-AP 13, configuring the uplink data transfer via the serving AP 13 requires communicating the uplink resource request of the UD to the serving AP 13. For delay-intolerant applications with ultra-low latency constraints on data delivery, the latency of forwarding the UL resource request to the serving AP 13 would result in significant additional delay in the uplink data transfer. With features as described herein, various methods and apparatus may be provided for uplink data transfers which are suitable to meet the performance goals of the various types of applications.

When the uplink-access AP is not the serving-AP 13, there are at least three options in which the uplink data transfers could be accomplished. This may be accomplished by at least partially using an uplink-access AP (such as 14 or 15) which is not the serving-AP. These at least three options are referred to herein as: Serving-AP uplink transfer, Solicited-AP uplink transfer, and Assisted-AP uplink transfer.

Serving-AP Uplink Transfer:

In this scheme, the uplink resource request received by the uplink-access AP (14 or 15) is forwarded to the serving AP 13, which in turn allocates uplink resources for the UD 10. Thus, the uplink data transfer is accomplished via the serving AP 13. This scheme may be used for applications which require maximized uplink data throughput, but can tolerate the additional latency incurred due to forwarding the uplink request.

Solicited-AP Uplink Transfer:

In this scheme, transfer of the uplink data transfer is performed through the uplink-access AP (14 or 15). All other communication between the UD and the network (such as downlink data transfer) are done through the serving-AP 13. This scheme may be used for applications requiring ultra-low latency data transfer with strict delay constrains on data delivery.

Assisted-AP Uplink Transfer:

In this scheme, transfer of the uplink data begins through the uplink-access AP (14 or 15). However, at the same time, the uplink-access AP makes an estimate how long the uplink data transfer will continue and/or the throughput requirement. This estimation can be based on the data buffer status received from the UD, or other information about the underlying application. This estimation can also be based on observation of the uplink data transfer over a time interval. Based on this estimate, the uplink-access AP (14 or 15) may send a request for uplink data transfer handover of the uplink data transfer to the serving-AP 13. After the serving-AP 13 receives the uplink data transfer handover request, it may initiate scheduling of uplink resource allocation to the UD 10 to transfer the remaining uplink data. This scheme is useful for minimizing the start-up delay in the uplink data transfer, and subsequently maximizing uplink throughput and efficiency of uplink transfer.

When an UD 10 performs uplink access via a stand-by AP 14 or 15, a mechanism may be used for downlink communication from the stand-by AP and the UD. In order to enable rapid rerouting protocol, the stand-by APs of an UD, or a subset of it, may have pre-configured downlink control channels which the UD 10 may monitor. Thus, if the UD performs an uplink access with a stand-by AP which has a pre-configured DL control channel for the UD, the AP may use that channel to send responses to the uplink access. However, if the stand-by AP is not pre-configured with a DL control channel for the UD, the UD may indicate in the uplink access request the particular DL control channel of the stand-by AP it will monitor.

User Device Functions:

The access points in the cluster set of an UD may be pre-configured with the following information with respect to the UD, or the UD may include the following information in its uplink access request message to a stand-by AP:

The downlink control channel to be used by the stand-by AP for sending the response to the uplink resource request from the UD.

The priority information for uplink data transfer for which this uplink resource request is being made.

After sending the uplink resource request, the UD may monitor the downlink control channel for the stand-by AP as indicated in the uplink access message or preconfigured.

Access Point Functions:

On receiving an uplink resource request from the UD, the AP may determine whether it is the serving AP for the requesting UD. If the AP is not the serving AP for the requesting UD, the AP may do the following:

Send an acknowledgement to the UD indicating successful uplink access.

Determine the uplink data transfer scheme to be used based on the priority information (which is either pre-configured in the stand-by AP or included in the uplink request message).

Depending on the data transfer scheme, the AP may perform the procedures for the determined uplink data transfer scheme (such as Serving-AP, or Solicited-AP, or the Assisted-AP for example). Examples for these three options are described below.

Procedures for Serving-AP Uplink Transfer:

In this data transfer scheme, the additional functions of the various components of the system can be described as follows.

User Device Functions:

The UD may include the following additional information in its uplink access request message to a stand-by AP (or the AP may be pre-configured with these information about the UD):

Its serving-AP identification, to which the uplink data transfer handover request for uplink data transfer should be delivered.

Its CSM identification and routing information to the CSM.

Access Point Functions:

After determining that the uplink transfer scheme to be the Serving-AP uplink transfer, the AP may perform the following actions:

It forwards the uplink resource request to the serving AP, requesting a uplink data transfer handover. This can be accomplished, for example, in the following two ways:

The AP forwards it to the serving-AP directly, or

The AP sends a request to the CSM of the UD to forward the request to the serving AP.

The serving AP, on receiving the uplink data transfer handover request for uplink data transfer for an UD, begins scheduling uplink resource allocation for the UD.

CSM Functions:

On receiving a request for uplink resources for the UD, the CSM may forward the request to the serving AP of the UD.

Figure 7:
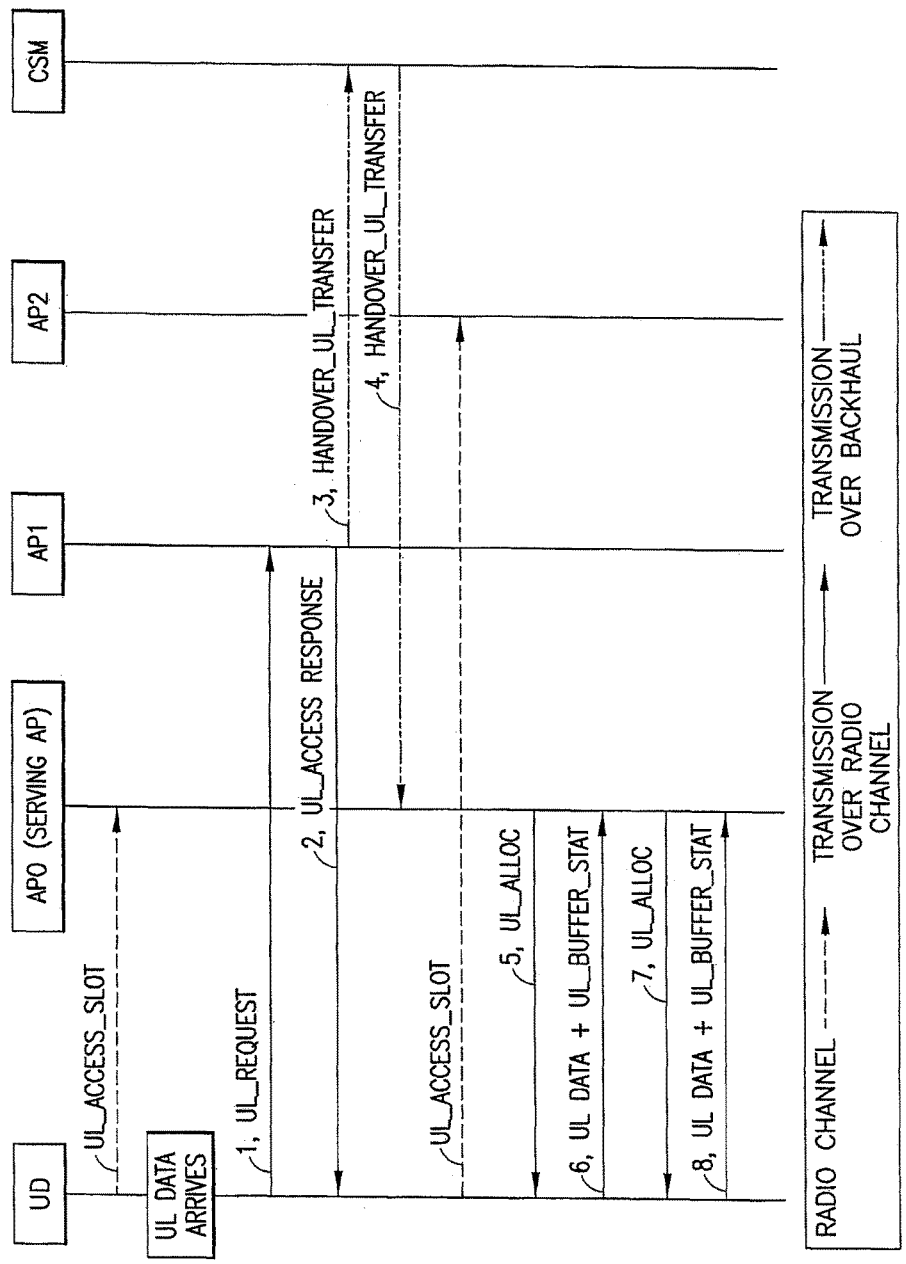
FIG. 7 is a diagram illustrating uplink access and data transfer protocol for an example of Serving-AP uplink transfer.

An example of the above mentioned protocol is illustrated in FIG. 7. In this diagram, the uplink data arrives into the UD's uplink buffer after the uplink access opportunity (UL_access_slot) of the serving-AP (AP0) is passed. The protocol messages are as follows:

Message (1): The UD uses the uplink access opportunity of AP1 which is a standby AP in its cluster set to send UL resource request (UL_request).

Message (2): AP1 sends an acknowledgement for successful UL access (UL_access_response).

Messages (3), (4): On receiving the uplink resource request (UL_request) from the UD, AP1 sends a request for uplink data transfer handover (Handover_UL_transfer) to the serving-AP via the CSM.

Messages (5)-(8): On receiving the uplink data transfer handover request, the serving-AP begins scheduling UL resources for the UD. The UD, on receiving UL allocation, transmits uplink data and UL buffer status to the serving AP.

Features in the above protocol include how the APs respond to successful reception of an uplink resource request, and how the uplink resource allocation is done. The method may comprises:

On receiving an uplink access request, an AP forwards the request to the serving AP via the CSM.

The uplink resource allocation by an AP is triggered by reception of an uplink resource request, not directly from the UD, but from another network element.

Procedures for Solicited-AP Uplink Transfer:

In this data transfer scheme, the additional functions of the various components of the system can be described as follows.

User Device Functions:

After sending the uplink access request, in addition to monitoring the DL control channels of its serving-AP, the UD also monitors the downlink control channel of the uplink-access-AP (for the acknowledgement to its uplink resource request as well as future uplink resource allocations). It may continue this monitoring until the uplink data transfer ends.

Access Point Functions:

After determining that the uplink transfer scheme is Solicited-AP uplink transfer, the AP may perform the following actions:

It allocates uplink resources to the UD. This allocation may be sent along with the acknowledgement message for the successful uplink access.

Since the UD is monitoring the downlink control channels of both the serving-AP and the uplink-access AP, in rare scenario, it is possible that the UD is scheduled to receive DL data and also to transmit UL data in the same slot. In this scenario, the contention resolution may be done on the basis of the relative priorities of the DL or UL data transfer.

Figure 8:
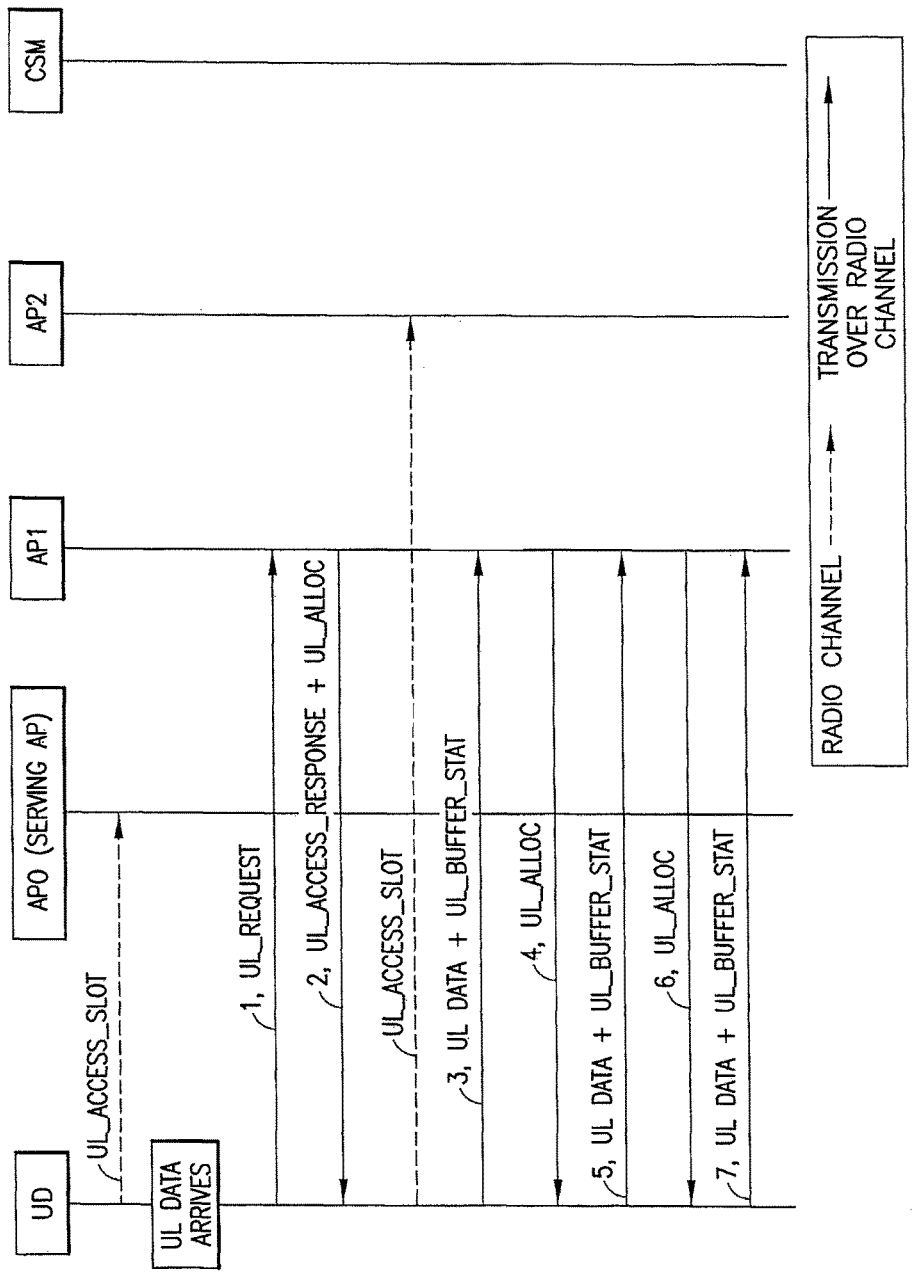
FIG. 8 is a diagram illustrating uplink access and data transfer protocol for an example of Solicited-AP uplink transfer.

The above mentioned protocol is illustrated in FIG. 8. The protocol messages in this example are as follows:

Message (1): The UD uses the uplink access opportunity of AP1, which is a standby AP in its cluster set, to send UL resource request (UL_request).

Message (2)-(7): AP1 sends an acknowledgement for successful UL access, and also begin scheduling UL resource allocation for the UD.

Procedures for Assisted-AP Uplink Transfer

In this data transfer scheme, the functions of the various components of the system can be described as follows.

User Device Functions:

The UD may include the following additional information in its uplink resource request message to a stand-by AP (or the AP may be pre-configured with these information about the UD):

Its serving-AP identification, to which the uplink resource request should be delivered.

Its CSM identification, and how to route to it.

Access Point Functions:

After determining that the uplink transfer scheme is Assisted-AP uplink transfer, the AP may perform the following actions:

It allocates uplink resources to the UD. This allocation may be sent along with the acknowledgement message for the successful uplink access.

It forwards the uplink resource request to the serving AP, requesting a uplink data transfer handover. This can be accomplished in the following two ways for example:

The AP forwards it to the serving-AP directly

The AP sends a request to the CSM of the UD to forward the request to the serving AP.

The serving AP, on receiving the uplink data transfer handover request for an UD, may begin scheduling uplink resource allocation for the UD.

CSM Functions:

On receiving a request for uplink resources for the UD, the CSM may forward the request to the serving AP of the UD.

After sending the uplink access request, in addition to monitoring the DL control channels of its serving-AP, the UD may also monitor the downlink control channel of the stand-by AP (for the acknowledgement to its uplink resource request as well as future uplink resource allocations). It may continue this monitoring and uplink data transmissions to the stand-by AP until the uplink data transfer ends, or the uplink data transfer handover is completed, whichever happens earlier.

After the serving-AP begins scheduling uplink resource allocation, the UD may receive UL allocations from both the serving-AP and the uplink-access AP. On receiving an UL resource allocation from its serving-AP, the UD may do the following:

If the UD has unacknowledged UL data to send, it transmits UL data; it may also include its UL buffer status information.

It enters into the UL data transfer handover phase, in which it does the following to execute the uplink data transfer handover:

If it receives an UL resource allocation from the uplink-access AP, it sends the 'end-of-buffer' command to the uplink-access AP. On receiving the end-of-buffer command, the AP stops further allocation of UL resources for the UD.

If it receives an UL resource allocation from the serving-AP, and it has unacknowledged data to transfer, it will transmit the data and also piggyback the UL buffer status to the serving AP.

Figure 9:
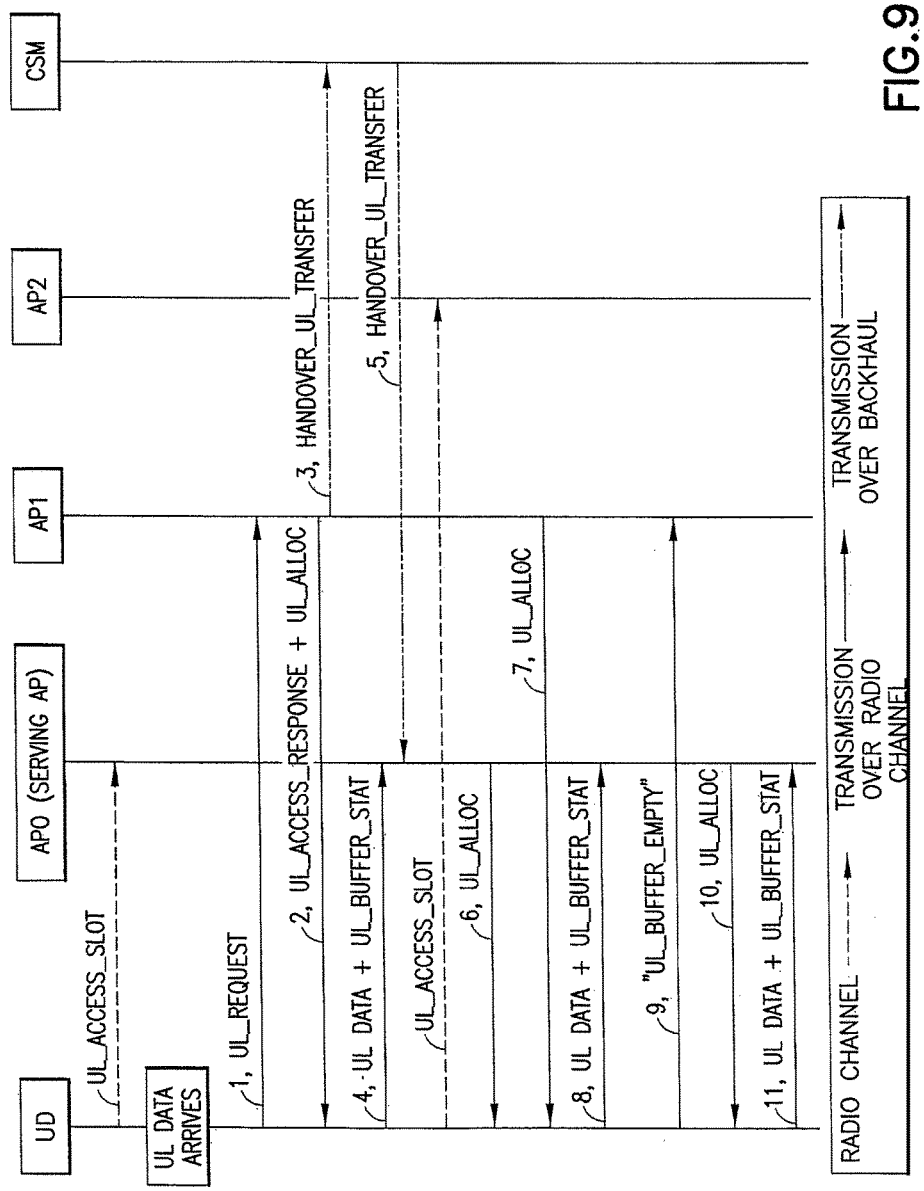
FIG. 9 is a diagram illustrating uplink access and data transfer protocol for an example of Assisted-AP uplink transfer.

The above mentioned protocol is illustrated in FIG. 9. The protocol messages may be as follows for example:

Message (1): The UD uses the uplink access opportunity of AP1 which is a standby AP in its cluster set to send UL resource request (UL_request).

Messages (2), (3): On receiving the uplink resource request (UL_request) from the UD, AP1 sends an acknowledgement for successful UL access and also begin scheduling UL resource allocation for the UD (UL_access_response and UL_alloc); in addition, AP1 sends a request for uplink data transfer handover (Handover_UL_transfer) to the CSM of the UD.

Message (4): UD sends uplink data and UL buffer status to AP1 (UL_data and UL_buffer_stat).

Messages (5): CSM forwards the request for uplink data transfer handover (Handover_UL_transfer) to the serving-AP of the UD.

Message (6): On receiving the request for uplink data transfer handover, the serving-AP (AP0) begins scheduling UL resources for the UD (UL_alloc).

Message (8): On receiving UL allocation from AP0, UD sends UL data and buffer status information (UL_data and UL_buffer_stat).

Messages (7), (9): On receiving UL allocation from AP1, the UD responds with an "UL_buffer_empty" status;

On receiving 'UL_buffer_empty" status, AP1 stops UL resource allocation for UD.

Messages (10), (11): AP0 continue scheduling UL resource allocation as long as the UL buffer status is non-empty.

Since the schedulers at the serving-AP and the uplink-access AP are operating independently of each other, it may be possible that the resource allocations from the serving-AP and the uplink-access AP are overlapping on the same slot, and the UD may need to resolve the conflict. This conflict resolution can be done as follows for example: The UD ignores the allocation from the uplink-access AP and uses the allocation from the serving-AP. The uplink-access AP will reallocate UL resources again. The UD continues this process until one of the following happens:

- The UD receives an allocation from the uplink-access AP which is not conflicted by an allocation from the serving-AP. The UD may use this UL allocation to send the 'end-of-buffer' command to the uplink-access AP.
- The maximum number of reallocations from the uplink-access AP is exhausted.

The proposed methods for uplink data transfer may be used to provide efficient and low-latency uplink access procedures in a mmWave 5G system. Features as described herein enable efficient low-latency uplink access (to deliver the 5G requirements of "true local feel" performance) without sacrificing the user data throughput performance. Features as described herein are suitable for serving applications which require very high data rate and also very low latency response.

The AP may receive an uplink resource request from an UD, which may include one or more of the following:
- The downlink control channel designated to be used by the stand-by AP for sending the response to the uplink resource request from the UD.
- The priority information for uplink data transfer for which this uplink resource request is being made.
- Serving-AP identification of the UD.
- CSM identification of the UD and how to route to it.

The AP may determine whether it is the serving AP for the requesting UD. If the AP is not the serving AP for the requesting UD, the AP may do the following:
- Determine the uplink data transfer scheme to be used based on the priority information: Serving-AP or Solicited-AP or Assisted-AP uplink transfer.
- Send an acknowledgement to the UD indicating successful uplink access. It may also notify the UD of the selected data transfer scheme along with this message.
- If the scheme is Serving-AP uplink data transfer, it may forward the uplink resource request to the serving AP; requesting a uplink data transfer handover. This forwarding may be accomplished either by directly sending the request to the serving AP, or by sending the request to the CSM of the UD, which in turn sends the request to the serving AP.
- If the scheme is Solicited-AP uplink data transfer, it may begin scheduling uplink resource allocations for the UD, using the designated downlink control channel monitored by the UD.
- If the scheme is Assisted-AP uplink data transfer,
  - it may forward the uplink resource request to the serving AP, requesting a uplink data transfer handover. This forwarding may be accomplished either by directly sending the request to the serving AP, or by sending the request to the CSM of the UD, which in turn sends the request to the serving AP.
  - it may begin scheduling uplink resource allocations for the UD, using the designated downlink control channel monitored by the UD.

The serving AP, on receiving the uplink data transfer handover request for an UD, may begin scheduling uplink resource allocation for the UD.

When sending an uplink resource request to a stand-by AP, the UD may include one or more of the following:
- The downlink control channel designated to be used by the stand-by AP for sending the response to the uplink resource request from the UD.
- The priority information for uplink data transfer for which this uplink resource request is being made.
- Serving-AP identification of the UD.
- CSM identification of the UD and how to route to it.

UD may begin monitoring the designated DL control channel of the stand-by AP to which it sends the uplink resource request, in addition to monitoring the DL control channel of its serving-AP.

UD may receive an acknowledgement for the successful uplink access from the stand-by AP.

If the scheme is Solicited-AP uplink data transfer, the UD may continue monitoring the DL control channel of the uplink-access AP and transmits uplink data to it as scheduled.

If the scheme is Assisted-AP uplink data transfer, the UD may continue monitoring the DL control channel of the uplink-access AP.

After receiving an UL resource allocation from its serving-AP:
- UD may send unacknowledged UL data and its UL buffer status to the serving AP.
- When the UD receives an UL resource allocation from the uplink-access AP, it may send "UL_buffer_empty" status to the uplink-access AP.

The Cluster Set Manager (CSM) may receive a uplink data transfer handover request for an UD. The CSM may determine the serving AP for the UD. The CSM may forward the uplink data transfer handover request to the serving AP.

Figure 10:
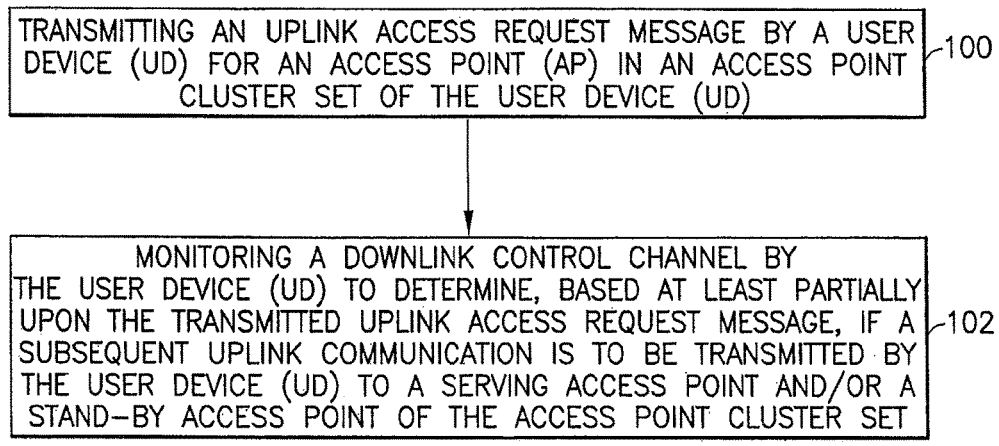
FIG. 10 is a diagram illustrating an example method.

Referring also to FIG. 10, an example method may comprise transmitting an uplink access request message by a user device (UD) for an access point (AP) in an access point cluster set of the UD as indicated by block 100; and monitoring a downlink control channel by the user device (UD) as indicated by block 102 to determine, based at least partially upon the transmitted uplink access request message, if a subsequent uplink communication is to be transmitted by the user device (UD) to a serving access point and/or a stand-by access point of the access point cluster set.

Transmitting the uplink access request message may comprise transmitting an indication of a downlink control channel to be used by the access point (AP) for sending a reply to the uplink access request message. Transmitting the uplink access request message may comprise transmitting priority information for uplink data transfer for which the uplink access request message is being made. The priority information may be configured to at least partially indicate to the access point (AP) to selection one of at least three uplink transfer modes for the subsequent uplink communication. Based at least partially on the monitoring, the transmitting of the subsequent uplink communication by the user device (UD) may comprise selecting by the user device (UD) one of at least three transfer modes comprising: transmitting the subsequent uplink communication directly to the serving access point; transmitting the subsequent uplink communication directly to the stand-by access point; and transmitting a portion of the subsequent uplink communication directly to the stand-by access point and transmitting another portion of the subsequent uplink communication directly to the serving access point. In the case of the 'Solicited-AP' and 'Assisted-AP' data transfer, the UD sends the uplink data packets to the stand-by AP; the stand-by AP forwards them to their destination using the routing protocol.

The UD may monitor a downlink control channel of the access point to which it sent the uplink access request and also monitors the downlink control channel of its serving AP. The user device (UD) may receive uplink resource allocation from the serving access point and subsequently transmits uplink data and/or uplink data buffer status over those uplink resource allocation. The user device (UD) may receive uplink resource allocation from the stand-by access point and subsequently transmit uplink data and/or uplink data buffer status over those uplink resource allocation. The user device (UD) may receive an uplink allocation from the stand-by access point subsequent to receiving an uplink allocation from its serving access point, and the UD may send an 'empty-buffer' status to the stand-by access point over its allocation uplink resources to instruct the stand-by access point to stop further allocation of uplink resources.

An example embodiment may be provided in an apparatus comprising at least one processor; and at least one non-transitory memory including computer program code, the at least one memory and the computer program code configured to, with the at least one processor, cause the apparatus to: transmit an uplink access request message by the apparatus for an access point (AP) in an access point cluster set; and monitor a downlink control channel by the apparatus to determine, based at least partially upon the transmitted uplink access request message, if a subsequent uplink communication is to be transmitted by the apparatus to a serving access point and/or a stand-by access point of the access point cluster set.

The operation to transmit the uplink access request message may comprise transmitting an indication of a downlink control channel to be used by the access point (AP) for sending a reply to the uplink access request message. The operation to transmit the uplink access request message may comprise transmitting priority information for uplink data transfer for which the uplink access request message is being made. The priority information may be configured to at least partially indicate to the access point (AP) to selection one of at least three uplink transfer modes for the subsequent uplink communication. Based at least partially on the monitoring, the operations may include transmitting of the subsequent uplink communication by the apparatus selecting one of at least three transfer modes comprising: transmitting the subsequent uplink communication directly to the serving access point; transmitting the subsequent uplink communication directly to the stand-by access point; and transmitting a portion of the subsequent uplink communication directly to the stand-by access point and transmitting another portion of the subsequent uplink communication directly to the server access point.

An example embodiment may be provide in a non-transitory program storage device, such as the memory 216 shown in FIG. 3 for example, readable by a machine, tangibly embodying a program of instructions executable by the machine for performing operations, the operations comprising: transmitting an uplink access request message by a user device (UD) for an access point (AP) in an access point cluster set of the UD; and monitoring a downlink control channel by the user device (UD) to determine, based at least partially upon the transmitted uplink access request message, if a subsequent uplink communication is to be transmitted to a serving access point and/or a stand-by access point of the access point cluster set. Transmitting the uplink access request message may comprise transmitting an indication of a downlink control channel to be used by the access point (AP) for sending a reply to the uplink access request message. Transmitting the uplink access request message comprises transmitting priority information for uplink data transfer for which the uplink access request message is being made. The priority information may be configured to at least partially indicate to the access point (AP) to selection one of at least three uplink transfer modes for the subsequent uplink communication. Based at least partially on the monitoring, the transmitting of the subsequent uplink communication by the user device (UD) may comprise selecting by the user device (UD) one of at least three transfer modes comprising: transmitting the subsequent uplink communication directly to the serving access point; transmitting the subsequent uplink communication directly to the stand-by access point; and transmitting a portion of the subsequent uplink communication directly to the stand-by access point and transmitting another portion of the subsequent uplink communication directly to the serving access point.

Figure 11:
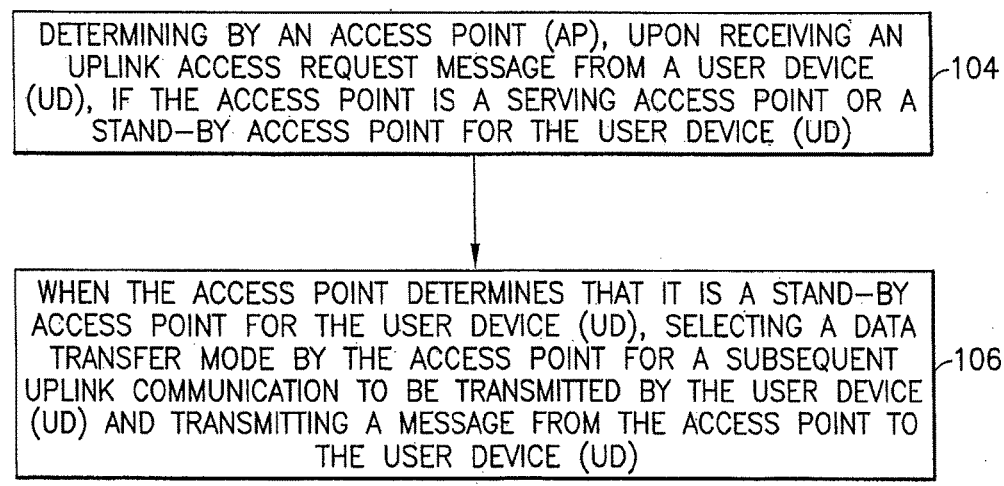
FIG. 11 is a diagram illustrating an example method.

Referring also to FIG. 11, an example method may comprise determining by an access point (AP), upon receiving an uplink access request message from a user device (UD), if the access point is a serving access point or a stand-by access point for the user device (UD) as indicated by block 104; and when the access point determines that it is a stand-by access point for the user device (UD), selecting a data transfer mode by the access point for a subsequent uplink communication to be transmitted by the user device (UD) and transmitting a message from the access point to the user device (UD) as indicated by block 106.

Selecting the data transfer mode may comprise selecting the data transfer mode from one of at least three data transfer modes comprising: the stand-by access point not receiving the subsequent uplink communication; the stand-by access point receiving the subsequent uplink communication; and the stand-by access point receiving a first portion of the subsequent uplink communication, and not receiving a second portion of the subsequent uplink communication which is directly received by the serving access point. Selecting of the data transfer mode may be based, at least partially, upon information received by the stand-by access point from the user device (UD) with an uplink access request message received by the stand-by access point directly from the user device (UD). Selecting of the data transfer mode may be based, at least partially, upon the information comprising priority information in the uplink access request message for uplink data transfer for which the uplink access request message is being made. The method may further comprise the stand-by access point transmitting a uplink data transfer handover request based, at least partially, upon information received by the stand-by access point from the user device (UD) with an uplink access request message received by the stand-by access point directly from the user device (UD).

An example apparatus may be provided comprising at least one processor; and at least one non-transitory memory including computer program code, the at least one memory and the computer program code configured to, with the at least one processor, cause the apparatus to: determine by the apparatus, upon receiving an uplink access request message from a user device (UD), if the apparatus is a serving access point or a stand-by access point for the user device (UD); and when the apparatus determines that it is a stand-by access point for the user device (UD), selecting a data transfer mode for a subsequent uplink communication to be transmitted by the user device (UD) and transmitting a message from the apparatus to the user device (UD). Selecting the data transfer mode may comprise selecting the data transfer mode from one of at least three data transfer modes comprising: the stand-by access point not receiving the subsequent uplink communication; the stand-by access point receiving the subsequent uplink communication; and the stand-by access point receiving a first portion of the subsequent uplink communication, and not receiving a second portion of the subsequent uplink communication which is directly received by the serving access point. Selecting of the data transfer mode may be based, at least partially, upon information received by the stand-by access point from the user device (UD) with an uplink access request message received by the stand-by access point directly from the user device (UD). Selecting of the data transfer mode may be based, at least partially, upon the information comprising priority information in the uplink access request message for uplink data transfer for which the uplink access request message is being made. The operations may further comprise the stand-by access point transmitting a uplink data transfer handover request based, at least partially, upon information received by the stand-by access point from the user device (UD) with an uplink access request message received by the stand-by access point directly from the user device (UD).

An example embodiment may be provided in a non-transitory program storage device, such as memory 226 shown in FIG. 3 for example, readable by a machine, tangibly embodying a program of instructions executable by the machine for performing operations, the operations comprising: determining by an access point (AP), upon receiving an uplink access request message from a user device (UD), if the access point is a serving access point or a stand-by access point for the user device (UD); and when the access point determines that it is a stand-by access point for the user device (UD), selecting a data transfer mode by the access point for a subsequent uplink communication to be transmitted by the user device (UD) and transmitting a message from the access point to the user device (UD). Selecting the data transfer mode may comprise selecting the data transfer mode from one of at least three data transfer modes comprising: the stand-by access point not receiving the subsequent uplink communication; the stand-by access point receiving the subsequent uplink communication; and the stand-by access point receiving a first portion of the subsequent uplink communication, and not receiving a second portion of the subsequent uplink communication which is directly received by the serving access point. Selecting of the data transfer mode is based, at least partially, upon information received by the stand-by access point from the user device (UD) with an uplink access request message received by the stand-by access point directly from the user device (UD). Selecting of the data transfer mode is based, at least partially, upon the information comprising priority information in the uplink access request message for uplink data transfer for which the uplink access request message is being made. The non-transitory program storage device may further comprise the stand-by access point transmitting a uplink data transfer handover request based, at least partially, upon information received by the stand-by access point from the user device (UD) with an uplink access request message received by the stand-by access point directly from the user device (UD).

Any combination of one or more computer readable medium(s) may be utilized as the memory. The computer readable medium may be a computer readable signal medium or a non-transitory computer readable storage medium. A non-transitory computer readable storage medium does not include propagating signals and may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. A method comprising:
   transmitting an uplink access request message by a user device for an access point in an access point cluster set of the user device, wherein the access point cluster set includes one or more stand-by access points, and a serving access point through which the user device communicates with at least one network;
   monitoring a downlink control channel by the user device to determine, based at least partially upon the transmitted uplink access request message, if a subsequent uplink communication is to be transmitted by the user device to at least one of the serving access point and at least one of the one or more stand-by access points of the access point cluster set, wherein, when monitoring for a downlink communication from the at least one of the one or more stand-by access points, the user device is configured to at least one of:
   monitor for the downlink communication via a preconfigured downlink control channel, and
   indicate in the transmitted uplink access request message a particular downlink control channel that the user device is monitoring;
   where, based at least partially on the monitoring, operations include transmitting of the subsequent uplink communication by the user device using one of at least three transfer modes comprising:
   transmitting the subsequent uplink communication directly to the serving access point;
   transmitting the subsequent uplink communication directly to at least one of the one or more stand-by access points; and
   transmitting a portion of the subsequent uplink communication directly to the at least one of the one or more stand-by access points and transmitting another portion of the subsequent uplink communication directly to the serving access point; and
   receiving uplink resource allocation from the at least one of the one or more stand-by access points and subsequently transmitting at least one of uplink data and uplink data buffer status over those uplink resource allocation.

2. A method as in claim 1 where transmitting the uplink access request message comprises transmitting an indication of a downlink control channel to be used by the access point for sending a reply to the uplink access request message.

3. A method as in claim 1 where transmitting the uplink access request message comprises transmitting priority information for uplink data transfer for which the uplink access request message is being made.

4. A method as in claim 3 where the priority information is configured to at least partially indicate to the access point to select one of at least three uplink transfer modes for the subsequent uplink communication.

5. An apparatus comprising:
at least one processor; and
at least one non-transitory memory including computer program code, the at least one memory and the computer program code configured to, with the at least one processor, cause the apparatus to:
transmit an uplink access request message by the apparatus for an access point in an access point cluster set of the apparatus, wherein the access point cluster set includes one or more stand-by access points, and a serving access point through which the apparatus communicates with at least one network;
monitor a downlink control channel by the apparatus to determine, based at least partially upon the transmitted uplink access request message, if a subsequent uplink communication is to be transmitted by the apparatus to at least one of the serving access point and the one or more stand-by access points of the access point cluster set, wherein, when monitoring for a downlink communication from the at least one of the one or more stand-by access points, the apparatus is configured to at least one of:
monitor for the downlink communication via a preconfigured downlink control channel, and
indicate in the uplink access request message a particular downlink control channel that the apparatus is monitoring;
where, based at least partially on the monitoring, operations include transmitting of the subsequent uplink communication by the apparatus using one of at least three transfer modes comprising:
transmitting the subsequent uplink communication directly to the serving access point;
transmitting the subsequent uplink communication directly to at least one of the one or more stand-by access points; and
transmitting a portion of the subsequent uplink communication directly to the at least one of the one or more stand-by access points and transmitting another portion of the subsequent uplink communication directly to the serving access point; and
receive uplink resource allocation from the at least one of the one or more stand-by access points and subsequently transmitting at least one of uplink data and uplink data buffer status over those uplink resource allocation.

6. An apparatus as in claim 5 where the transmit of the uplink access request message comprises transmitting an indication of a downlink control channel to be used by the access point for sending a reply to the uplink access request message.

7. An apparatus as in claim 5 where the operation to transmit the uplink access request message comprises transmitting priority information for uplink data transfer for which the uplink access request message is being made.

8. An apparatus as in claim 7 where the priority information is configured to at least partially indicate to the access point to select one of at least three uplink transfer modes for the subsequent uplink communication.

9. An apparatus as in claim 5 where further comprising monitoring a downlink control channel of the access point to which it sent the uplink access request and also monitoring the downlink control channel of its serving access point.

10. An apparatus as in claim 5 further comprising receiving uplink resource allocation from the serving access point and subsequently transmitting at least one of uplink data and uplink data buffer status over those uplink resource allocation.

11. An apparatus as in claim 5 further comprising receiving an uplink allocation from the at least one of the one or more stand-by access points subsequent to receiving an uplink allocation from its serving access point, and sending an 'empty-buffer' status to the at least one of the one or more stand-by access points over its allocation uplink resources to instruct the at least one of the one or more stand-by access points to stop further allocation of uplink resources.

12. A method comprising:
determining by an access point, upon receiving an uplink access request message from a user device, if the access point is a serving access point through which the user device communicates with at least one network or a stand-by access point for the user device;
when the access point determines that it is a stand-by access point for the user device, selecting a data transfer mode by the access point for a subsequent uplink communication to be transmitted by the user device and transmitting a message from the access point to the user device, wherein, when transmitting a downlink communication from the stand-by access point to the user device, the access point is configured to at least one of:
transmit the downlink communication via a preconfigured downlink control channel, and
receive an indication in the uplink access request message to transmit the downlink communication via a particular downlink control channel that the user device is monitoring;
where, the subsequent uplink communication is received from the user device using one of at least three transfer modes comprising:
receiving the subsequent uplink communication directly by the serving access point,
receiving the subsequent uplink communication directly by at least one of the one or more stand-by access points, and
receiving a portion of the subsequent uplink communication directly by the at least one of the one or more stand-by access points and receiving another portion of the subsequent uplink communication directly by the serving access point; and
provide uplink resource allocation to the user device and subsequently receive at least one of uplink data and uplink data buffer status over those uplink resource allocation.

13. A method as in claim 12 where selecting the data transfer mode comprises selecting the data transfer mode from one of at least three data transfer modes comprising:
the stand-by access point not receiving the subsequent uplink communication;

the stand-by access point receiving the subsequent uplink communication; and the stand-by access point receiving a first portion of the subsequent uplink communication, and not receiving a second portion of the subsequent uplink communication which is directly received by the serving access point.

14. A method as in claim 12 where selecting of the data transfer mode is based, at least partially, upon information received by the stand-by access point from the user device with an uplink access request message received by the stand-by access point directly from the user device.

15. A method as in claim 14 where selecting of the data transfer mode is based, at least partially, upon the information comprising priority information in the uplink access request message for uplink data transfer for which the uplink access request message is being made.

16. A method as in claim 12 further comprising the stand-by access point transmitting a uplink data transfer handover request based, at least partially, upon information received by the stand-by access point from the user device with an uplink access request message received by the stand-by access point directly from the user device.

17. An apparatus comprising:
at least one processor; and
at least one non-transitory memory including computer program code, the at least one memory and the computer program code configured to, with the at least one processor, cause the apparatus to:
determine by the apparatus, upon receiving an uplink access request message from a user device, if the apparatus is a serving access point through which the user device communicates with at least one network or a stand-by access point for the user device of the one or more access points; and
when the apparatus determines that it is a stand-by access point for the user device, selecting a data transfer mode for a subsequent uplink communication to be transmitted by the user device and transmitting a message from the apparatus to the user device, wherein, wherein, when transmitting a downlink communication from the stand-by access point to the user device, the apparatus is configured to at least one of:
transmit the downlink communication via a preconfigured downlink control channel, and
receive an indication in the uplink access request message to transmit the downlink communication via a particular downlink control channel that the user device is monitoring;
where, the subsequent uplink communication is received from the user device using one of at least three transfer modes comprising:
receiving the subsequent uplink communication directly by the serving access point,
receiving the subsequent uplink communication directly by at least one of the one or more stand-by access points, and
receiving a portion of the subsequent uplink communication directly by the at least one of the one or more stand-by access points and receiving another portion of the subsequent uplink communication directly by the serving access point; and
provide uplink resource allocation to the user device and subsequently receive at least one of uplink data and uplink data buffer status over those uplink resource allocation.

18. An apparatus as in claim 17 where selecting the data transfer mode comprises selecting the data transfer mode from one of at least three data transfer modes comprising:
the stand-by access point not receiving the subsequent uplink communication;
the stand-by access point receiving the subsequent uplink communication; and
the stand-by access point receiving a first portion of the subsequent uplink communication, and not receiving a second portion of the subsequent uplink communication which is directly received by the serving access point.

19. An apparatus as in claim 17 where selecting of the data transfer mode is based, at least partially, upon information received by the stand-by access point from the user device with an uplink access request message received by the stand-by access point directly from the user device.

20. An apparatus as in claim 19 where selecting of the data transfer mode is based, at least partially, upon the information comprising priority information in the uplink access request message for uplink data transfer for which the uplink access request message is being made.

21. An apparatus as in claim 17 where the operations further comprise the stand-by access point transmitting a uplink data transfer handover request based, at least partially, upon information received by the stand-by access point from the user device with an uplink access request message received by the stand-by access point directly from the user device.

22. A method comprising:
receiving an uplink data transfer handover request by a cluster set manager of an user device, and
the cluster set manager determining a serving access point of the user device from an access point cluster set that includes one or more stand-by access points, and the serving access point through which the user device communicates with at least one network, and subsequently forwarding the uplink data transfer handover request to the serving access point of the user device, wherein, the cluster set manager is to configure the serving access point to, when transmitting a downlink communication from the stand-by access point to the user device, at least one of:
transmit the downlink communication via a preconfigured downlink control channel, and
receive an indication in the uplink access request message of a particular downlink control channel that the user device is monitoring;
based at least partially on monitoring by the user device, transmitting a subsequent uplink communication by the user device using one of at least three data transfer modes comprising:
transmitting the subsequent uplink communication directly to the serving access point,
transmitting the subsequent uplink communication directly to at least one of the one or more stand-by access points,
transmitting a portion of the subsequent uplink communication directly to the at least one of the one or more stand-by access points and transmitting another portion of the subsequent uplink communication directly to the serving access point, and
receiving an uplink allocation from the at least one of the one or more stand-by access points subsequent to receiving an uplink allocation from its serving access point, and sending an 'empty-buffer' status to the at least one of the one or more stand-by access points over its allocation uplink resources to instruct the at least one of the one or more stand-by access points to stop further allocation of uplink resources.

23. The method of claim 22, where the uplink data transfer handover request comprises priority information, the priority information is configured to at least partially indicate to the serving access point to select one of at least three data transfer modes for the subsequent uplink communication.

24. An apparatus comprising:
at least one processor; and
at least one non-transitory memory including computer program code, the at least one memory and the computer program code configured to, with the at least one processor, cause the apparatus to:
transmit an uplink access request message by the apparatus for an access point in an access point cluster set of the apparatus, wherein the access point cluster set includes one or more stand-by access points, and a serving access point through which the apparatus communicates with at least one network;
monitor a downlink control channel by the apparatus to determine, based at least partially upon the transmitted uplink access request message, if a subsequent uplink communication is to be transmitted by the apparatus to at least one of the serving access point and the one or more stand-by access points of the access point cluster set, wherein, when monitoring for a downlink communication from the at least one of the one or more stand-by access points, the apparatus is configured to at least one of:

monitor for the downlink communication via a preconfigured downlink control channel, and
indicate in the uplink access request message a particular downlink control channel that the apparatus is monitoring;
where, based at least partially on the monitoring, operations include transmitting of the subsequent uplink communication by the apparatus using one of at least three transfer modes comprising:
transmitting the subsequent uplink communication directly to the serving access point;
transmitting the subsequent uplink communication directly to at least one of the one or more stand-by access points; and
transmitting a portion of the subsequent uplink communication directly to the at least one of the one or more stand-by access points and transmitting another portion of the subsequent uplink communication directly to the serving access point; and
receive an uplink allocation from the at least one of the one or more stand-by access points subsequent to receiving an uplink allocation from its serving access point, and sending an 'empty-buffer' status to the at least one of the one or more stand-by access points over its allocation uplink resources to instruct the at least one of the one or more stand-by access points to stop further allocation of uplink resources.

* * * * *